(No Model.)

N. WASHBURN.
CAR WHEEL.

No. 261,192. Patented July 18, 1882.

Witnesses.
S. N. Piper
E. B. Pratt

Inventor.
Nathan Washburn.
by R. H. Eddy att'y.

UNITED STATES PATENT OFFICE.

NATHAN WASHBURN, OF ALLSTON, MASSACHUSETTS.

CAR-WHEEL.

SPECIFICATION forming part of Letters Patent No. 261,192, dated July 18, 1882.

Application filed August 27, 1881. (No model.)

*To all whom it may concern:*

Be it known that I, NATHAN WASHBURN, of Allston, of the county of Suffolk and State of Massachusetts, have invented a new and useful Improvement in Railway-Car Wheels; and I do hereby declare the same to be described in the following specification and represented in the accompanying drawings, of which—

Figure 1:
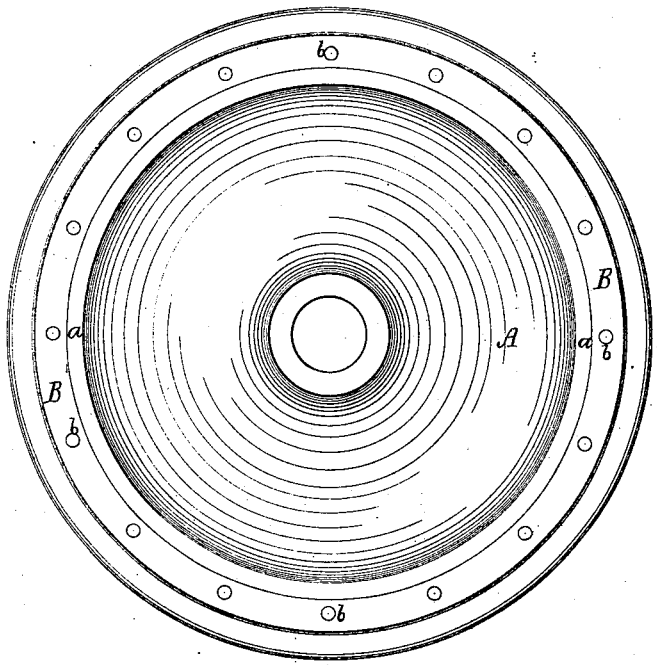
Figure 2:
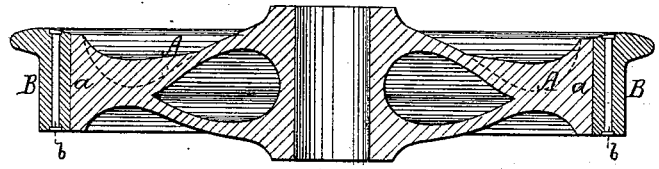
Figure 3:
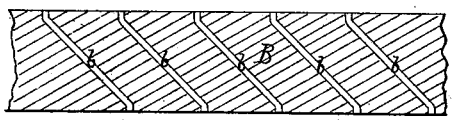

Figure 1 is a side view, and Fig. 2 a transverse section, of a car-wheel made in accordance with my invention, which relates to car-wheels having cast-iron bodies and steel tires, united in the process of casting or founding the bodies. Fig. 3 denotes a circular sectional view of the tire, showing the oblique portions of the wrought-iron re-enforces.

Wheels of this character while in use are liable, after they may have become grooved or worn down in their treads, to become split or cracked lengthwise in their tires, in which case the wheel-rim, united to the tire and being of cast-iron, is in danger of being broken under the blows received by the tire, the consequence being that on a breakage of the kind taking place, the tire, not being properly sustained by the rim, is apt in most, if not all, cases to become broken away more or less, thereby being occasionally, if not frequently, productive of serious accident.

In carrying out my invention I combine with the cast-iron wheel-body and its steel tire re-enforces to strengthen the tire laterally, or both laterally and longitudinally, so as to prevent it from being cracked and breaking away from the rim, or to hold its parts together in case of the tire becoming cracked or being weakened by wear.

In the drawings, A denotes the cast-iron body, and B the cast-steel tire, the rim with which the tire is united being shown at $a$. In the cast-steel tire B, and extending through it transversely or obliquely, as represented in Fig. 3, is a series of wrought-iron re-enforces, $b$, each consisting of a short bar or rod, usually headed at each end or screw-threaded from end to end, or grooved or notched transversely. They are disposed at equal distances apart within the tire, which generally is cast upon them in the mold for founding it, (the said tire.)

What I claim as my invention is as follows, viz:

1. The combination of a railway-car wheel having its body of cast-iron and its tire of cast-steel united in the process of casting the body within the tire, with a series of wrought-iron re-enforces, as described, arranged within and through the tire crosswise thereof, either at right angles with or obliquely to the opposite edges of the tire, all being substantially as set forth.

2. As an improved manufacture, a wheel-tire of cast-steel, having re-enforces, as described, arranged within it, substantially as set forth, and fixed therein by casting the steel upon them, (the said re-enforces,) when duly supported in the mold, all being essentially as explained.

NATHAN WASHBURN.

Witnesses:
R. H. EDDY,
E. B. PRATT.